United States Patent [19]  [11] Patent Number: 5,396,381
Yamano et al.  [45] Date of Patent: Mar. 7, 1995

[54] APPARATUS FOR IDENTIFYING A TYPE OF TAPE CASSETTE INSERTED INTO A TAPE RECORDER

[75] Inventors: Yosikazu Yamano, Osaka; Shingo Kage, Koube; Takehisa Takamiya; Yasunari Toyama, both of Osaka, all of Japan

[73] Assignee: Matsushita Electric Industrial Co., Ltd., Osaka, Japan

[21] Appl. No.: 996,539

[22] Filed: Dec. 24, 1992

[30] Foreign Application Priority Data

Dec. 27, 1991 [JP] Japan .................. 3-346010

[51] Int. Cl.⁶ .......................................... G11B 5/008
[52] U.S. Cl. ...................................... 360/96.5; 360/94
[58] Field of Search .................... 360/94, 96.5, 96.6, 360/132, 137

[56] References Cited

U.S. PATENT DOCUMENTS 5,161,079 11/1992 Ohshima et al. ............... 360/132
5,172,284 12/1992 Ohshima ........................ 360/94
5,231,553  7/1993 Weber et al. .................. 360/96.5

FOREIGN PATENT DOCUMENTS

3-71459  3/1991 Japan .......................... 360/96.5
3-97157  4/1991 Japan .......................... 360/96.5

Primary Examiner—Stuart S. Levy
Assistant Examiner—Jefferson Evans
Attorney, Agent, or Firm—Lowe, Price, Leblanc & Becker

[57] ABSTRACT

An apparatus for identifying the type of each of first and second types of tape cassettes which are inserted into the same cassette holder of a tape recorder in a longitudinal direction and mounted at a predetermined position in the tape recorder, the first tape cassette being provided with at least one recess at its side surface perpendicular to the longitudinal direction and the second tape cassette being provided with a projection at a position of its side surface corresponding to the position of the recess of the first tape cassette. The apparatus comprises a rotatable lever arranged to be at a predetermined recessive position before mounting the first and second tape cassettes and rotatable toward the first and second tape cassette after mounting the first and second tape cassettes. The rotatable lever engages with the recess of the first tape cassette and the projection of the second tape cassette by the rotation so as to take first and second operating states in accordance with the recess and projection. The apparatus further comprises a switch responsive to the first and second operating states of the rotatable lever so as to identify the kinds of the tapes of the first and second mounted tape cassettes on the basis of the first and second operating states.

4 Claims, 5 Drawing Sheets

APPARATUS FOR IDENTIFYING A TYPE OF TAPE CASSETTE INSERTED INTO A TAPE RECORDER

BACKGROUND OF THE INVENTION

The present invention relates generally to a tape recorder applicable to different type tape cassettes, and more particularly to an apparatus for detecting the configurations of tape cassettes inserted and mounted in the tape recorder so as to identify the kinds of magnetic tapes encased in the tape cassettes to perform the recording and reproducing operation of a signal in accordance with the kind of the tape of the inserted and mounted tape cassette.

Figure 8:
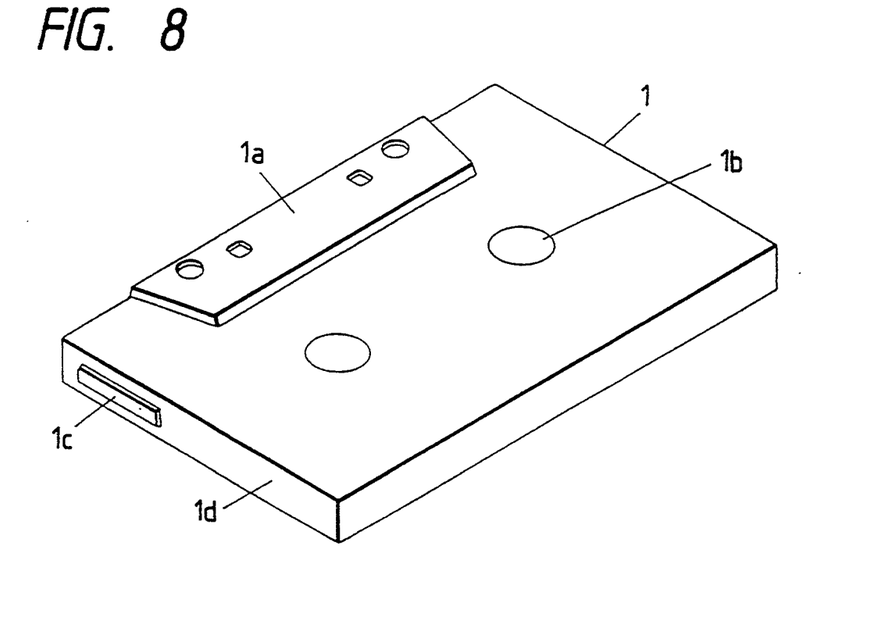
FIG. 8 is a perspective view showing an analog type compact cassette (ACC)

Recently, in the sound equipment field, digital type tape recorders which digitally record and reproduce an audio signal onto/from a magnetic tape are being developed for the sound quality increasing purposes. A portion of the digital type tape recorder takes the so-called S-DAT system, and the S-DAT system is similar in structure to the widely used conventional analog type tape recorders. Taking advantage of this similarity, a compatible type tape recorder is proposed which can record and reproduce both the digital and analog signals. The conventional compatible type tape recorder is arranged to be suitable for a conventional analog type compact cassette and a digital type compact cassette. As illustrated in FIG. 8, the analog type compact cassette (which will be referred hereinafter to as ACC) 1 is equipped with a thicker portion 1a partially provided at the front side to form an opening which can accommodate a magnetic head, a pinch roller and other components of a tape recorder and further equipped with reel hub hole 1b. On the other hand, as illustrated in FIG. 9, the digital type compact cassette (which will be referred hereinafter to as DCC) 2 is equipped with a shutter 2a which covers the magnetic tape in the opening in non-use and which, in use, is movable along the tape-travelling direction or the reverse direction to expose the magnetic tape to accommodate the magnetic head, pinch roller and others of the tape recorder.

Figure 9:
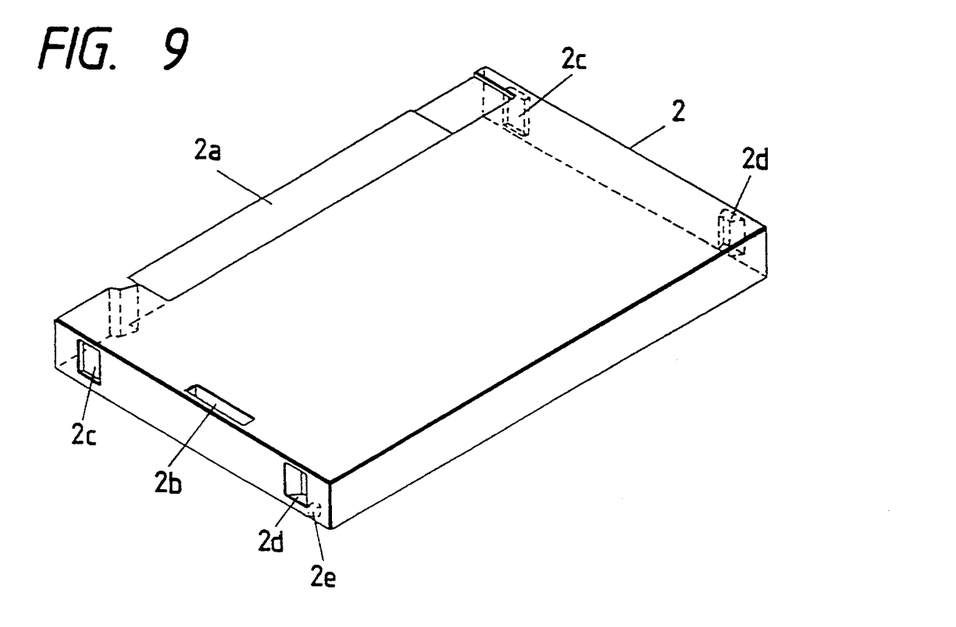
FIG. 9 is a perspective view showing a digital type compact cassette (DCC).

Because of mounting both the ACC 1 and DCC 2 in the same tape recorder, the ACC 1 and DCC 2 are arranged to be substantially equal in the entire configuration or dimension to each other, while the ACC 1 has, as shown in FIG. 8, projections 1c formed on both side surfaces and the DCC 2 has, as shown in FIG. 9, a recess 2e formed in a portion of the lower surface in addition to a gripping recess 2b formed in a portion of the upper surface and gripping recesses 2c, 2d formed in portions (corresponding in position to portions of the ACC 1 indicated by 1d in FIG. 8) of both the side surfaces. In response to the insertion of the DCC 2 in a direction (transverse direction) perpendicular to the longitudinal directions, the conventional compatible type tape recorder detects the presence of the aforementioned recess 2e, formed in the portion of the lower surface, by means of a detection switch provided at a cassette-insertion position of the tape recorder, thus deciding the insertion of the DCC 2 into the tape recorder.

However, for example, in the case of a car-use tape recorder in which the tape cassette is arranged to be inserted and discharged into and from the tape recorder along the longitudinal directions, because of the restriction on the structure for the detection of the recess 2e, difficulty is encountered to identify the kind of the tape cassette in practice.

SUMMARY OF THE INVENTION

It is therefore an object of the present invention to provide an apparatus for a compatible type tape recorder which is capable of surely detecting the kind of a tape cassette irrespective of the insertion of the tape cassette in the longitudinal directions and further smoothly inserting the tape cassette into the tape recorder.

In accordance with the present invention, there is provided an apparatus for identifying a kind of a tape of each of first and second tape cassettes to be inserted into a same cassette holder of a tape recorder and mounted at a predetermined position in the tape recorder, the first and second tape cassettes respectively having first and second configurations at their own side surfaces perpendicular to an longitudinal directions of the first and second tape cassettes, the apparatus comprising: detection means operable in accordance with the first and second configurations of the first and second tape cassettes when mounting the first and second tape cassettes, the detection means taking a first operating state in accordance with the first configuration when mounting the first tape cassette and taking a second operating state in accordance with the second configuration when mounting the second tape cassette; and switch means responsive to the first operating state of the first tape cassette and the second operating state of the second tape cassette so as to identify the kinds of the tapes of the first and second mounted tape cassettes on the basis of the first and second operating states of the detection means.

More specifically, the detection means comprises rotatable lever means arranged to be a predetermined rotational position, separated from a mounted position of the first and second tape cassettes, before mounting the first and second tape cassettes and rotatable toward the first and second tape cassettes in response to mounting the first and second tape cassette, the rotatable lever means engaging with the first and second configurations of the side surfaces of the first and second tape cassettes by the rotation so that the rotatable lever means takes the first and second operating states. Preferably, the rotatable lever means comprises: a first lever biased by a first spring so as to be rotated to move in a direction of the predetermined rotational position before mounting the first and second tape cassettes, the first lever being arranged to come into contact with the first and second tape cassettes when mounting the first and second tape cassettes so as to be rotated in a direction opposite to the predetermined rotational position direction; and a second lever biased in the direction opposite to the predetermined rotational position direction by a second spring whose biasing force is smaller than a biasing force of the first spring, the second lever being responsive to the rotation of the first lever in the predetermined rotational position direction so as to be rotated together with the first lever up to the predetermined rotational position, and the second lever being independently rotated by the second spring in the opposite direction when the first lever is rotated in the opposite direction by the first and second tape cassettes, the second lever engaging with the first and second configurations of the first and second tape cassette when rotating in the opposite direction so as to take the first and second operating states. It is also appropriate that the rotatable lever means comprises a lever having an engaging portion which is engageable and disengageable with head-mounting means of the tape recorder which mounts a recording and reproducing head of the tape recorder and which is movable by drive means to take a first position, separated from a mounted position of the first and second tape cassettes, before mounting the first and second tape cassettes and take a second position to cause the head of the tape recorder to approach the tape of the first and second tape cassettes when mounting the first and second tape cassettes, when the head-mounting means takes the first position, the engaging portion of the lever being engaged with the head-mounting means so that the lever is rotated in a direction to take the predetermined rotational position, and when head-mounting means takes the second position, the engaging portion of the lever being disengaged with the head-mounting means, the rotatable lever means further a spring for biasing the lever in a direction opposite to the predetermined rotational position direction whereby the lever is rotatable in the opposite direction when the engaging portion of the lever is disengaged with the head-mounting means, the lever engaging with the first and second configurations of the first and second tape cassettes by the rotation in the opposite direction so as to take the first and second operating states in accordance with the first and second configurations.

Further, according to this invention, there is provided an apparatus for identifying a kind of a tape of each of first and second tape cassettes inserted into a same cassette holder of a tape recorder and mounted at a predetermined position in the tape recorder, the first tape cassette being provided with at least one recess at its side surface perpendicular to longitudinal directions of the first tape cassette and the second tape cassette being not provided with a recess at its side surface perpendicular to longitudinal directions of the second tape cassette, the apparatus comprising: detection means operable in response to mounting the first and second tape cassettes, the detection means taking a first operating state due to an engagement with the recess when mounting the first tape cassette and taking a second operating state due to no engagement with the recess when mounting the second tape cassette; and switch means responsive to the first operating state of the first tape cassette and the second operating state of the second tape cassette so as to identify the kinds of the tapes of the first and second mounted tape cassettes on the basis of the first and second operating states of the detection means.

Still further, according to this invention, there is provided an apparatus for identifying a kind of a tape of each of first and second tape cassettes inserted into a same cassette holder of a tape recorder in a longitudinal direction and mounted at a predetermined position in the tape recorder, the first tape cassette being provided with at least one recess at its side surface perpendicular to the longitudinal direction and the second tape cassette being provided with a projection at a position of its side surface corresponding to the position of the recess of the first tape cassette, the apparatus comprising: detection means operable in response to mounting the first and second tape cassettes, the detection means taking a first operating state due to an engagement with the recess when mounting the first tape cassette and taking a second operating state due to an engagement with the projection when mounting the second tape cassette; and switch means responsive to the first operating state of the first tape cassette and the second operating state of the second tape cassette so as to identify the kinds of the tapes of the first and second mounted tape cassettes on the basis of the first and second operating states of the detection means.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1A:
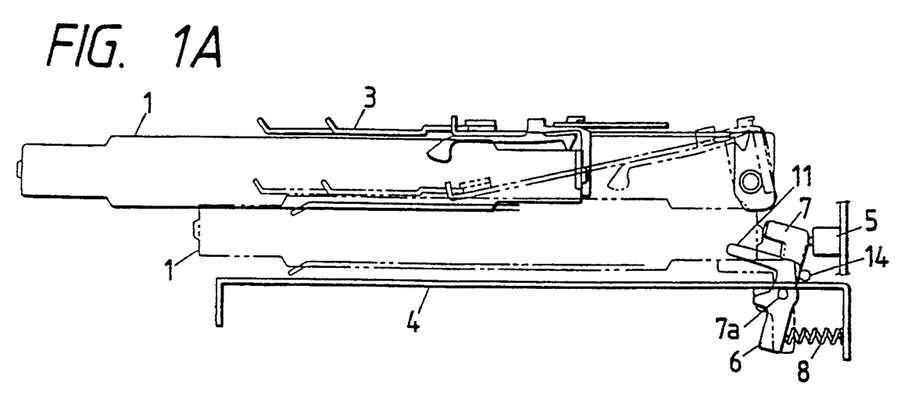
FIG. 1A is a side elevational and perspective view showing a tape-kind identifying apparatus according to a first embodiment of this invention in a state that an ACC is inserted and mounted in a holder of a tape recorder.
Figure 1B:
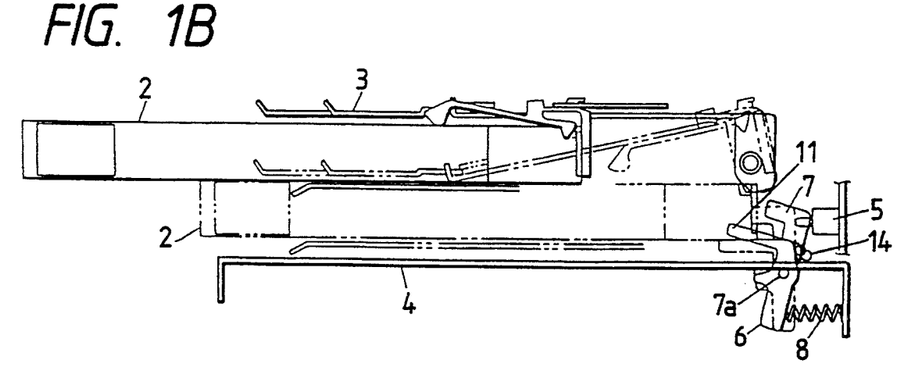
FIG. 1B is a side elevational and perspective view showing the tape-kind identifying apparatus according to the first embodiment of this invention in a state that a DCC is inserted and mounted in the holder of the same tape recorder.
Figure 2:
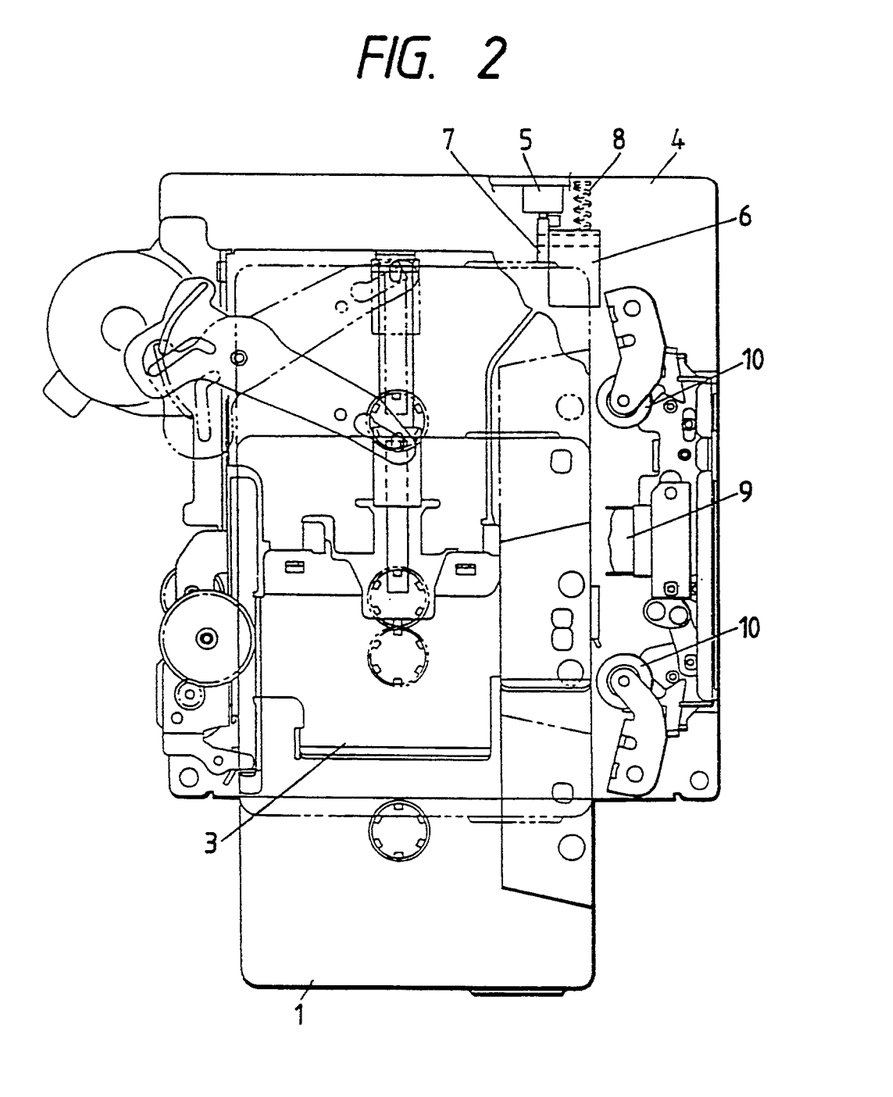
FIG. 2 is a perspective top view showing an internal structure of a tape recorder which includes the tape-kind identifying apparatus according to the first embodiment of this invention.
Figure 3:
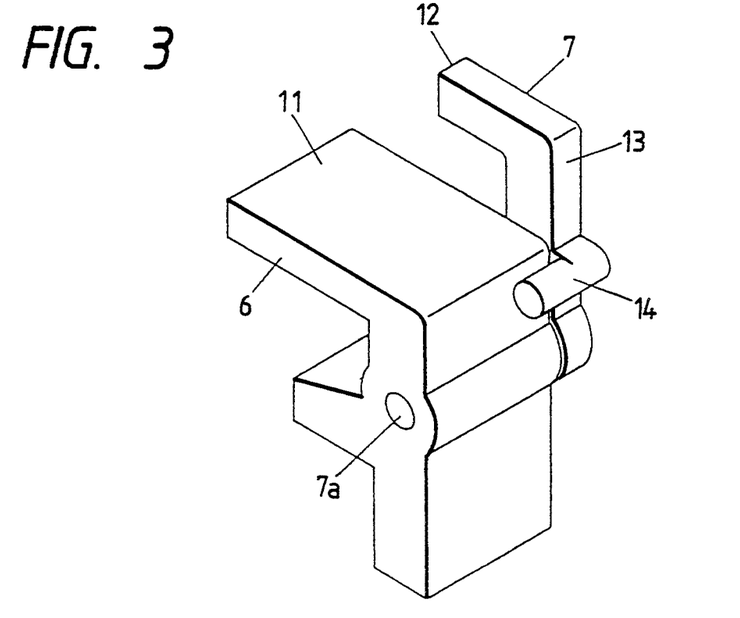
FIG. 3 is a enlarged perspective view showing a structural relation between first and second switch levers constituting the tape-kind identifying apparatus according to the first embodiment of this invention.

A description will be made hereinbelow with reference to FIGS. 1A to 3 in terms of a tape-kind identifying apparatus for identifying a type of a tape encased in a tape cassette inserted into a tape recorder according to a first embodiment of the present invention. FIG. 1A shows a state of the tape-kind identifying apparatus to be taken when an ACC is inserted and mounted in a holder of a tape recorder where a two-dot chain line indicates a completely ACC-mounted state, FIG. 1B shows a state of the tape-kind identifying apparatus to be taken when a DCC is inserted and mounted in the holder of the same tape recorder where a two-dot chain line indicates a completely DCC-mounted state, FIG. 2 illustrates an arrangement of the tape-kind identifying apparatus together with an internal structure of the tape recorder. In FIG. 1A, 1B and 2, the tape-kind identifying apparatus is equipped with a cassette detection mechanism comprising a switch 5, a first switch lever 6 and a second switch lever (detection lever) 7 which are operable in response to configurations of an ACC 1 and a DCC 2 inserted and mounted in the tape recorder. Here, as illustrated in FIG. 3, the first and second switch levers 6 and 7 are arranged side by side and coupled through a common shaft 7a to each other so as to be rotatable about the common shaft 7a. The second switch lever 7 has a protrusive portion 14 which is engageable with a portion of the first switch lever 6 and has a surface 13 which is arranged to come into contact with the switch 5. The first switch lever 6 has a surface 11 which is arranged to come into contact with a tape cassette (ACC 1 or DCC 2) inserted to be mounted in the tape recorder. Further, as illustrated in FIG. 2, the tape recorder is provided with cassette holder 3 for holding a tape cassette (ACC, DCC) inserted, a magnetic head 9 for recording and reproducing signals on and from analog and digital magnetic tapes and pinch rollers 10 for guiding the analog and digital tapes. Further, the tape recorder is equipped with a cassette-mounting mechanism for mounting the tape cassette, inserted into the holder 3, at a predetermined position in the tape recorder so that the magnetic head 9 can take the confronting relation to the magnetic tape of the tape cassette.

Returning back to FIGS. 1A and 1B, in operation, in the case of no completion of the mounting of the ADD1 or DCC 2 inserted into the holder 3, due to a biasing or urging force of a switch lever spring 8 provided between one end portion of the first switch lever 6 and a base plate 4 of the tape recorder, the first switch lever 6 takes a state that the cassette-contacting surface 11 (see FIG. 3) is rotationally lifted with respect to the base plate 4 of the tape recorder. Due to the lifting, the first switch lever 6 depresses the protrusive portion 14 of the second switch lever 7 so that the second switch lever 7 is rotationally moved up to a recessive (saving) position. That is, as indicated by a solid line in FIGS. 1A and 1B, at the time of inserting the ACC 1 or DCC 2 in the holder 3 of the tape recorder but before mounting the ACC 1 or DCC 2 in the tape recorder, the second switch lever 7 is arranged to be rotationally operated by the first switch lever 6 so as to move up to the recessive position at which the second switch lever 7 does not interfere with the ACC1 or DCC 2 when the above-mentioned cassette-mounting mechanism mounts the ACC 1 or DCC 2 in the tape recorder, thereby surely and smoothly mounting the ACC 1 or DCC 2 at the mounting position in the tape recorder. When taking the saving position, the switch contacting surface 13 of the second switch lever 7 is depressing a contact of the switch 5. Here, this contact of the switch 5 is a spring type of returning toward the original position when being released from the depressed state, that is, it additionally acts as a spring (defined as a second spring in the claims).

In FIG. 1A, in response to the completion of the mounting of the ACC 1 in the tape recorder, the cassette-contacting surface 11 of the first switch lever 6 is depressed downwardly by the lower surface of the ACC 1 so that the first switch lever 6 is rotated about the common shaft 7a against the biasing force of the switch lever spring 8, whereby the protrusive portion 14 of the second switch lever 17 is released from the depression of the first switch lever 6 so that the contact of the switch 5 is movable toward the original position by its own returning force (smaller than the biasing force of the switch lever spring 8) to cause the second switch lever 7 to be depressed by the contact of the switch 5 to be be rotated reversely (counterclockwise in the illustration) about the common shaft 7a so that a tip portion 12 of the second switch lever 7 moves toward the mounted ACC 1. At this time, the tip portion 12 (see FIG. 3) of the second switch lever 7 comes into contact with the projection 1c, provided at one outer side surface of the ACC 1 (see FIG. 8), without rotationally returning up to the original position. This movement of the second switch lever 7 is slight whereby the switch 5 maintains the operating state.

On the other hand, in response to mounting the DCC 2 in the tape recorder, the cassette-contacting surface 11 of the first switch lever 6 is similarly depressed downwardly by the lower surface of the DCC 2 so that the second switch lever 7 is rotated reversely about the common shaft 7a against the biasing force of the switch lever spring 8 so as to release the protrusive portion 14 of the second switch lever 7 from the depression of the first switch lever 6, thereby pushing back the second switch lever 7 by the returning force of the contact of the switch 5. Here, the second switch lever 7 can return up to a position to completely turn off the switch 5 because the tip portion 12 of the second switch lever 7 enters into the recess 2c formed in a portion (corresponding in position to the projection 1c of the ACC 1) of one side surface of the DCC 2 (see FIG. 9).

With the above-described arrangement, when the ACC 1 having the projection 1c is mounted in the tape recorder, the switch 5 takes the operating state, and when the DCC 2 having the recess 2c is mounted in the tape recorder, the switch 5 takes the non-operating state, thus detecting the configurations (the projection 1c, recess 2c) of the inserted and mounted tape cassettes to identify the kind of the magnetic tape.

Figure 4:
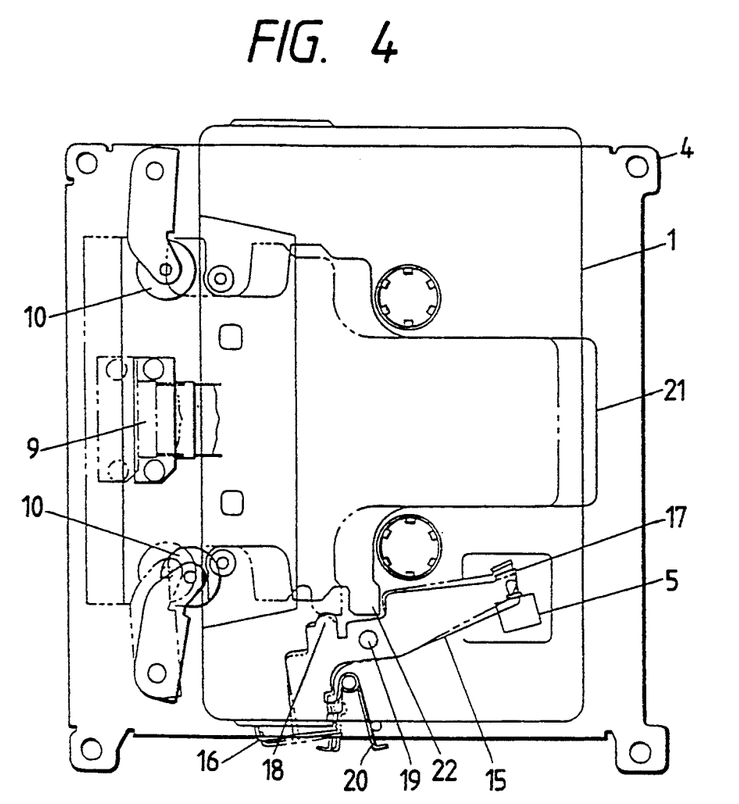
FIG. 4 is a perspective top view showing a tape-kind identifying apparatus according to a second embodiment of this invention in a state that an ACC is mounted in a tape recorder.
Figure 5:
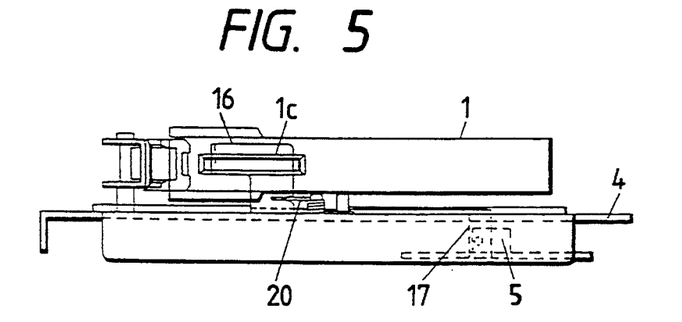
FIG. 5 is a side elevational and perspective view showing showing the tape-kind identifying apparatus according to the second embodiment of this invention in the state that the ACC is mounted in the tape recorder.
Figure 6:
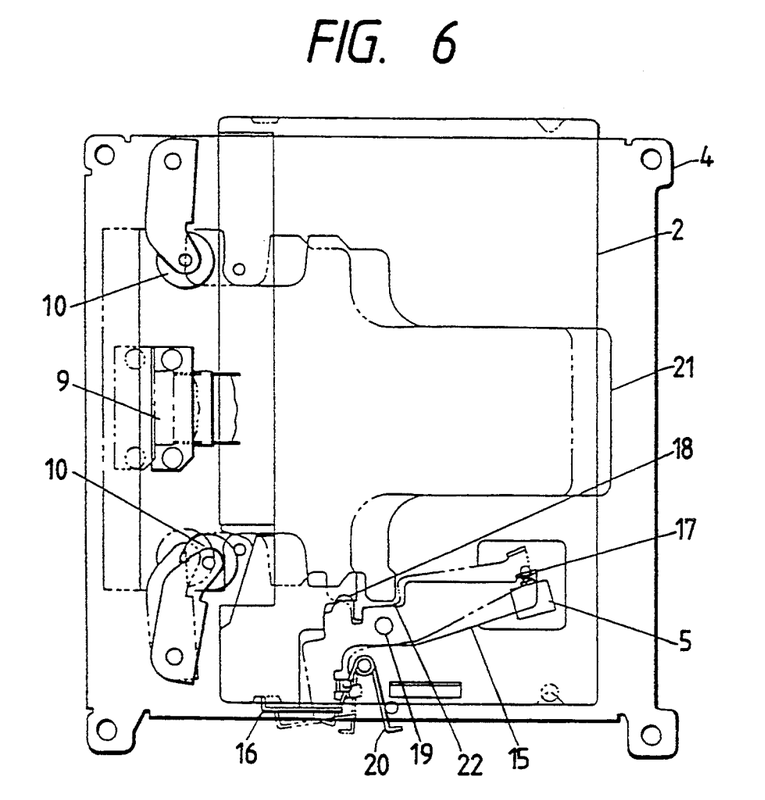
FIG. 6 is a perspective top view showing showing a tape-kind identifying apparatus according to the second embodiment of this invention in a state that an DCC is mounted in the tape recorder.
Figure 7:
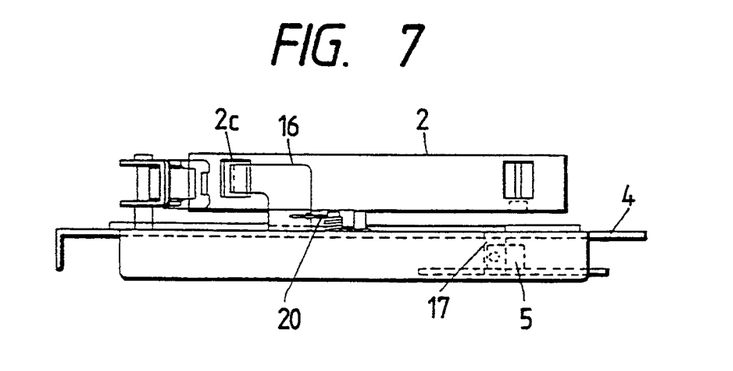
FIG. 7 is a side elevational and perspective view showing showing the tape-kind identifying apparatus according to the second embodiment of this invention in the state that the DCC is mounted in the tape recorder.

Further, a description will be made hereinbelow with reference to FIGS. 4 to 7 in terms of a tape-kind identifying apparatus according to a second embodiment of this invention. FIGS. 4 and 5 show a tape-kind identifying apparatus according to the second embodiment of this invention in a state that an ACC 1 is mounted in a tape recorder, and FIGS. 6 and 7 show a tape-kind identifying apparatus according to the second embodiment of this invention in a state that an DCC is mounted in the tape recorder. In FIGS. 4 to 7, parts corresponding to those in FIGS. 1A to 3 are marked with the same numerals.

In FIGS. 4 to 7, the tape-kind identifying apparatus according to this embodiment is equipped with a cassette-detecting mechanism comprising a switch lever 15 and a switch 5 which are disposed in the tape recorder so as to be engageable with each other (allow the engagement with each other). The switch lever 15 is arranged to be rotatable about a shaft 19 vertically provided on a stationary portion of the tape recorder and arranged to be biased by a switch lever spring 20 to be rotated in a predetermined direction (clockwise in the illustration). The switch lever 15 has at its one end portion an elongated detection member 16 one end of which extends from the body of the switch lever 15 to be allowable to come into contact with the projection 1c of the ACC 1 or enter into the recess 2c of the DCC 2 and has at the other end portion a switch-contacting member 17 which can come into contact with the switch 5 and further has a protrusive portion 18 at a position apart by a predetermined distance from the position of the shaft 19 (a left side position with respect to the shaft 19 in the illustration). The protrusive portion 18 is arranged to to be allowable to come into contact with an operating member (a protrusive portion in the illustration) 22 of a head-mounting plate 21 which is for mounting a magnetic head 9 and pinch rollers 10 and which is horizontally movable by an adequate drive means (for example, an electric motor). The head-mounting plate 21 can take two positions in accordance with whether or not the tape cassette is mounted in the tape recorder, one being a position taken for receiving the tape cassette (ACC 1, DCC 2) in the tape recorder and the other being a position taken for recording and reproducing signals on and from the magnetic tape of the tape cassette mounted.

In operation, in FIGS. 4 and 6, before mounting the tape cassette (ACC 1, DCC 2) in the tape recorder, the head-mounting plate 21 is driven by the drive means to recede up to a first position (recessive position) as indicated by a two-dot chain line. When the head-mounting plate 21 moves to the recessive position, the operating member 22 of the head mounting plate 21 is brought into contact with the protrusive portion 18 of the switch lever 15 and depresses the protrusive portion 18 thereof so as to rotate the switch lever 15 against the biasing force of the switch lever spring 20 in a predetermined direction (counterclockwise in the illustration) and then keep the switch lever 15 at a predetermined rotational position (corresponding to the recessive position of the head-mounting plate 21) as indicated by the two-dot chain line whereby the detection member 16 of the switch lever 15 recedes up to a position so as not to interfere with the tape cassette (ACC 1, DCC 2) to be mounted in the tape recorder.

On the other hand, after inserting and mounting the tape cassette (ACC1, DCC 2) in the tape recorder, the head-mounting plate 21 advances up to a second position (head-operating position relative to the magnetic tape of the tape cassette) as indicated by a solid line. When the head-mounting plate 21 reaches the second position, the operating member 22 releases the protrusive portion 18 of the switch lever 15 from the depression whereby the switch lever 15 becomes rotatable clockwise by the biasing force of the switch lever spring 20.

At this time, in the case that the tape cassette mounted is the ACC 1 having the projection 1c (see FIG. 8), as illustrated in FIG. 4, the detection member 16 of the switch lever 15 comes into contact with the projection 1c of the ACC 1 so as not to allow the switch lever 15 to sufficiently rotate, whereby difficulty is encountered to depress (turn on) the switch 5 through the switch-contacting member 17 provided at the other end portion of the switch lever 15. On the other hand, in the case that the tape cassette mounted is the DCC 2 having the recess 2c (see FIG. 9), the detection member 16 of the switch lever 15 is fitted in the recess 2c of the DCC 2 as illustrated in FIG. 6 so as to permit the switch lever 15 to sufficiently rotates by a predetermined angle by the biasing force of the switch lever spring 20 whereby the switch-contacting member 17 can depress and turn on the switch 5.

With this arrangement, when the ACC 1 having the projection 1c is mounted in the tape recorder, the switch 5 takes the non-operating state, and when the DCC 2 having the recess 2c is mounted in the tape recorder, the switch 5 takes the operating state, thus detecting the configurations (the projection 1c, recess 2c) of the inserted and mounted tape cassettes to identify the kind of the magnetic tape.

Although in the above-described embodiments the detection members (7, 16) are disposed to detect the projection 1c of the ACC 1 and the recess 2c of the DCC 2, this invention is not limited to the above-described embodiments. For example, it is also appropriate that the detection members are arranged to detect the other recess 2d of the DCC 2 and the flat portion 1d of the ACC 1. That is, the depth of the recess 2d is deeper than the recess 2c and hence the difference position between the recess 2d and the flat portion 1d allows the operation of the switch 5. Moreover, although in the above-described embodiments the tape cassette is inserted into the tape recorder in the longitudinal direction, this invention is not limited to these embodiments if the detection members are arranged to recede from the tape cassette when the tape cassette is mounted in the tape recorded.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An apparatus for identifying either of first and second types of tape cassettes inserted in a longitudinal direction into a cassette holder of a tape recorder and mounted at a predetermined position in said tape recorder, said first type of tape cassette having a first configuration at a position on a side surface thereof perpendicular to said longitudinal direction and said second type of tape cassette having a second configuration different from said first configuration at a position on a side surface thereof corresponding to the position of said first configuration of said first type of tape cassette, said apparatus comprising:

detection means operable in response to mounting of either of said first and second types of tape cassettes, said detection means taking a first operating state when engaged with said first configuration of said first tape cassette and taking a second operating state when engaged with said second configuration of said second tape cassette, and switch means responsive to said first and second operating states of said detection means for identifying the type of said first and second types of tape cassettes mounted in said tape recorder on the basis of said first and second operating states of said detection means;

said detection means comprising rotatable lever means arranged to be at a predetermined rotational position, separated from a mounted position of said first or second type of tape cassette, before mounting said first or second type of tape cassette and rotatable toward said first or second type of tape cassette after mounting said first or second type of tape cassette, said rotatable lever means engaging with said first configuration of said first type of tape cassette or said second configuration of said second type of tape cassette by rotation so that said rotatable lever means takes said first or second operating states, said rotatable lever means comprising first and second levers respectively rotatable independently of each other and first and second spring means for respectively biasing said first and second levers, said first lever being biased by said first spring so as to take said predetermined rotational position before mounting said first or second type of tape cassette and being arranged to contact with said second lever when rotated in a direction of said predetermined rotational position so that said second lever also takes said predetermined rotational position, and said first lever being arranged to be rotated by the mounting of either of the first and second types of tape cassettes into said tape recorder in a direction opposite to the predetermined rotational position direction independently of said second lever and, when said first lever is rotated in the opposite direction, said second lever being rotated by said second spring means in the same direction so as to engage with said first configuration of said first type of tape cassette or said second configuration of said second type of tape cassette.

2. An apparatus as claimed in claim 1, wherein said first and second levers are coupled through a common shaft with each other so as to be rotatable about said common shaft independently.

3. An apparatus as claimed in claim 1, wherein said switch means comprises a switch having a contact engageable with said second lever and biased to return to an original position, said second spring means comprising said contact of said switch means to rotate said second lever in the opposite direction.

4. An apparatus for identifying either of first and second types of tape cassettes inserted in a longitudinal direction into a cassette holder of a tape recorder and mounted at a predetermined position in said tape recorder, said first type of tape cassette having a first configuration at a position on a side surface thereof perpendicular to the said longitudinal direction and said second type of tape cassette having a second configuration different from said first configuration at a position on a side surface thereof corresponding to the position of said first configuration of said first type of tape cassette, said apparatus comprising:

detection means operable in response to mounting of either of said first and second types of tape cassettes, said detection means taking a first operating state when engaged with said first configuration of said first tape cassette and taking a second operating state when engaged with said second configuration of said second tape cassette, and switch means responsive to said first and second operating states of said detection means for identifying the type of said first and second types of tape cassettes mounted in said tape recorder on the basis of said first and second operating states of said detection means;

said detection means comprising rotatable lever means arranged to be at a predetermined rotational position, separated from a mounted position of said first or second type of tape cassette, before mounting said first or second type of tape cassette and rotatable toward said first or second type of tape cassette after mounting said first or second type of tape cassette, said rotatable lever means engaging with said first configuration of said first type of tape cassette or said second configuration of said second type of tape cassette by rotation so that said rotatable lever means takes said first or second operating states, said rotatable lever means comprising a lever having an engaging portion engageable with and disengageable form head-mounting means of said tape recorder which mounts a recording and reproducing head of said tape recorder and which is movable by drive means therefore to take a first position, separated from a mounted position of said first and second types of tape cassettes, before mounting either of said first and second types of tape cassettes and to take a second position to cause said head of said tape recorder to approach the tape of either of said first and second types of tape cassettes when mounting said either of first and second types of tape cassettes, when said head-mounting means takes said first position, said engaging portion of said lever being engaged with said head-mounting means so that said lever is rotated in a direction to take said predetermined rotational position, and when said head-mounting means takes said second position, said engaging portion of said lever being disengaged from said head-mounting means, said rotatable lever means further comprising a spring for biasing said lever in a direction opposite to the predetermined rotational position direction whereby said lever is rotatable in the opposite direction when said engaging portion of said lever is disengaged from said head-mounting means, said lever engaging with said first configuration of said first tape cassette or said second configuration of said second tape cassette by rotation in the opposite direction to take said first and second operating states.

* * * * *